United States Patent
Aoki

(10) Patent No.: US 6,957,545 B2
(45) Date of Patent: Oct. 25, 2005

(54) VEHICLE AIR CONDITIONER WITH VENTILATING FUNCTION WHILE PARKING

(75) Inventor: Shinji Aoki, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/724,947

(22) Filed: Dec. 1, 2003

(65) Prior Publication Data

US 2004/0107713 A1 Jun. 10, 2004

(30) Foreign Application Priority Data

Dec. 9, 2002 (JP) .............................. 2002-356165

(51) Int. Cl.$^7$ .......................... F25B 41/00; B60H 1/32; F25D 23/12
(52) U.S. Cl. ............................ 62/208; 62/211; 62/244; 62/261; 454/120
(58) Field of Search ........................ 62/208, 211, 244, 62/261, 186; 454/120; 236/49.3

(56) References Cited

U.S. PATENT DOCUMENTS

| | | | |
|---|---|---|---|
| 5,687,573 A * | 11/1997 | Shih .............................. 62/3.6 |
| 5,896,750 A * | 4/1999 | Karl .............................. 62/236 |
| 6,059,018 A * | 5/2000 | Yoshinori et al. .............. 165/42 |
| 6,158,225 A * | 12/2000 | Muto et al. .................... 62/3.7 |
| 6,578,910 B2 * | 6/2003 | Andersson et al. ..... 297/180.11 |
| 6,758,741 B2 * | 7/2004 | Aoki et al. .................. 454/137 |
| 2004/0069482 A1 | 4/2004 | Yoshinori et al. | |

FOREIGN PATENT DOCUMENTS

JP 5-244731 9/1993

OTHER PUBLICATIONS

US 6,830,510, 12/2004, Aoki et al. (withdrawn)*

* cited by examiner

Primary Examiner—Marc Norman
(74) Attorney, Agent, or Firm—Harness, Dickey & Pierce, PLC

(57) ABSTRACT

An air conditioning apparatus preferentially ventilates a space close to a seat and/or a steering wheel on which a passenger directly makes a contact in a passenger compartment while a vehicle is parked. The uncomfortable feeling of a passenger that might occur when he/she is getting into the parked vehicle can be reduced using a small capacity in the air conditioning as compared to the air conditioning apparatus ventilating the whole space in the vehicle.

12 Claims, 4 Drawing Sheets

VEHICLE AIR CONDITIONER WITH VENTILATING FUNCTION WHILE PARKING

CROSS REFERENCE TO RELATED APPLICATION

This application is based upon Japanese Patent Application No. 2002-356165, filed on Dec. 9, 2002, the contents of which are incorporated herein by reference.

BACKGROUND OF THE INVENTION

1. Field of the Invention

The present invention relates to a vehicle air conditioner, which has a ventilating function while the vehicle is parked so as to keep a temperature of a passenger compartment of the vehicle from increasing while the vehicle is parked.

2. Related Art

An air conditioner such as the one disclosed in JP-A-H05-244731 has a ventilating fan powered by a solar cell battery so that the fan is operated to exhaust heated air in a passenger compartment of a vehicle to the outside of the vehicle while the vehicle is parked, to keep the temperature of the air inside the vehicle from increasing by the incident of the sunlight. As a result, a passenger would not feel uncomfortable when he/she gets in the vehicle which has been parked for a long time under the blazing sun.

SUMMARY OF THE INVENTION

An object of the present invention is to provide an improved vehicle air conditioning apparatus capable of reducing the above-mentioned problem.

According to an aspect of the present invention, the air conditioning apparatus blows air from a surface of a passenger seat of a vehicle while the vehicle is parked. This will reduce the uncomfortable feeling of a passenger when he/she gets into the vehicle.

According to an aspect of the present invention, the air conditioning apparatus blows air toward a steering device for a driver while the vehicle is parked. This will reduce the uncomfortable feeling of a passenger when he/she gets into the vehicle.

According to an aspect of the present invention, the air conditioning apparatus has a blower unit mounted at a front side of the vehicle. The blower unit ventilates the air in the passenger compartment of the vehicle by introducing the air from the outside of the vehicle while the vehicle is parked. This will reduce the uncomfortable feeling of a passenger when he/she gets into the vehicle.

According to an aspect of the present invention, the air conditioning apparatus has a blower unit mounted at a rear side of the vehicle. The blower unit ventilates the air in the passenger compartment of the vehicle by exhausting the air from the passenger compartment of the vehicle while the vehicle is parked. This will reduce the uncomfortable feeling of a passenger when he/she gets into the vehicle.

According to another aspect of the present invention, the air conditioning apparatus has adjusting means for reducing the sunlight incident into a passenger compartment of the vehicle, which is activated when the vehicle is parked. This will reduce the uncomfortable feeling of a passenger when he/she gets into the vehicle.

Further areas of applicability of the present invention will become apparent from the following detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
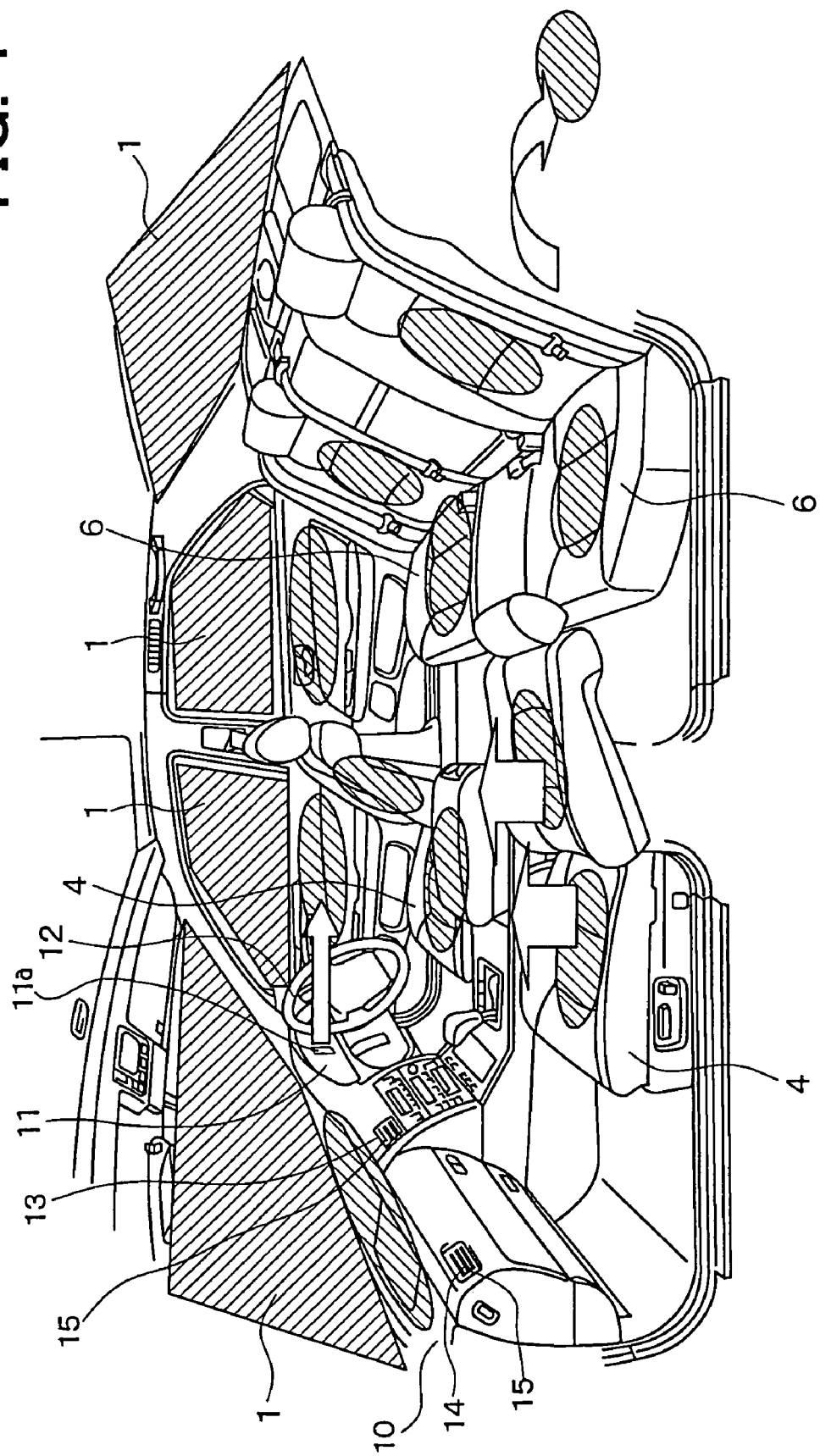
FIG. 1 is a partial perspective view showing the inside of a vehicle of the present invention.

Specific embodiments of the present invention will now be described hereinafter with reference to the accompanying drawings in which the same or similar component parts are designated by the same or similar reference numerals.

(First Embodiment)

First, a schematic ventilation system of a vehicle will be described with reference to FIGS. 1, 2 and 3. An air conditioning apparatus applied to a sedan-type vehicle is shown in FIG. 1 with an inside structure of the vehicle. Light-transmissivity control glass 1 is used for a windshield and windowpanes of the vehicle as shown in FIG. 1 as sunlight incident reducing means to reduce the amount of sunlight incident into a passenger compartment of the vehicle through the windshield and the windowpanes or to block the sunlight coming into the passenger compartment.

The light-transmissivity control glass 1 is, for example, the one which controls the transmissivity of the sunlight by having a predetermined voltage applied to it.

The air conditioning apparatus is to condition the inside of the passenger compartment by adjusting the temperature of the air blown into the compartment. In this embodiment, the apparatus has a front-side air conditioning unit 2 as shown in FIG. 2, a rear-side air conditioning unit 3 as shown in FIG. 3, a front-seat air conditioning unit 5 as shown in FIG. 2, and a rear-seat air conditioning unit 7 as shown in FIG. 3. The front-side air conditioning unit 2 mainly conditions the front-side space. The rear-side air conditioning unit 3 mainly conditions the rear-side space. The front-seat air conditioning unit 4 blows the conditioned air through an epidermis (surface) of a front seat 4. The rear-seat air conditioning unit 7 blows the conditioned air through an epidermis (surface) of a rear seat 6.

The epidermis is not limited to natural leather. That is, the epidermis includes the other material used to make a surface of a seat.

The front-side and rear-side air conditioning units 2 and 3 have low-pressure heat exchangers 2a and 3a, respectively, which are evaporators in a vapor-compressive type refrigerant cycle serving as means for cooling the air blown into the passenger compartment. The front-side and rear-side air conditioning units 2 and 3 have heaters 2b and 3b, respectively, which are located in a downstream side of air-flow with respect to the respective low-pressure heat exchangers 2a and 3a. Further, front-side and rear-side air conditioning units 2 and 3 have blower 2c and 3c, respectively.

Figure 2:
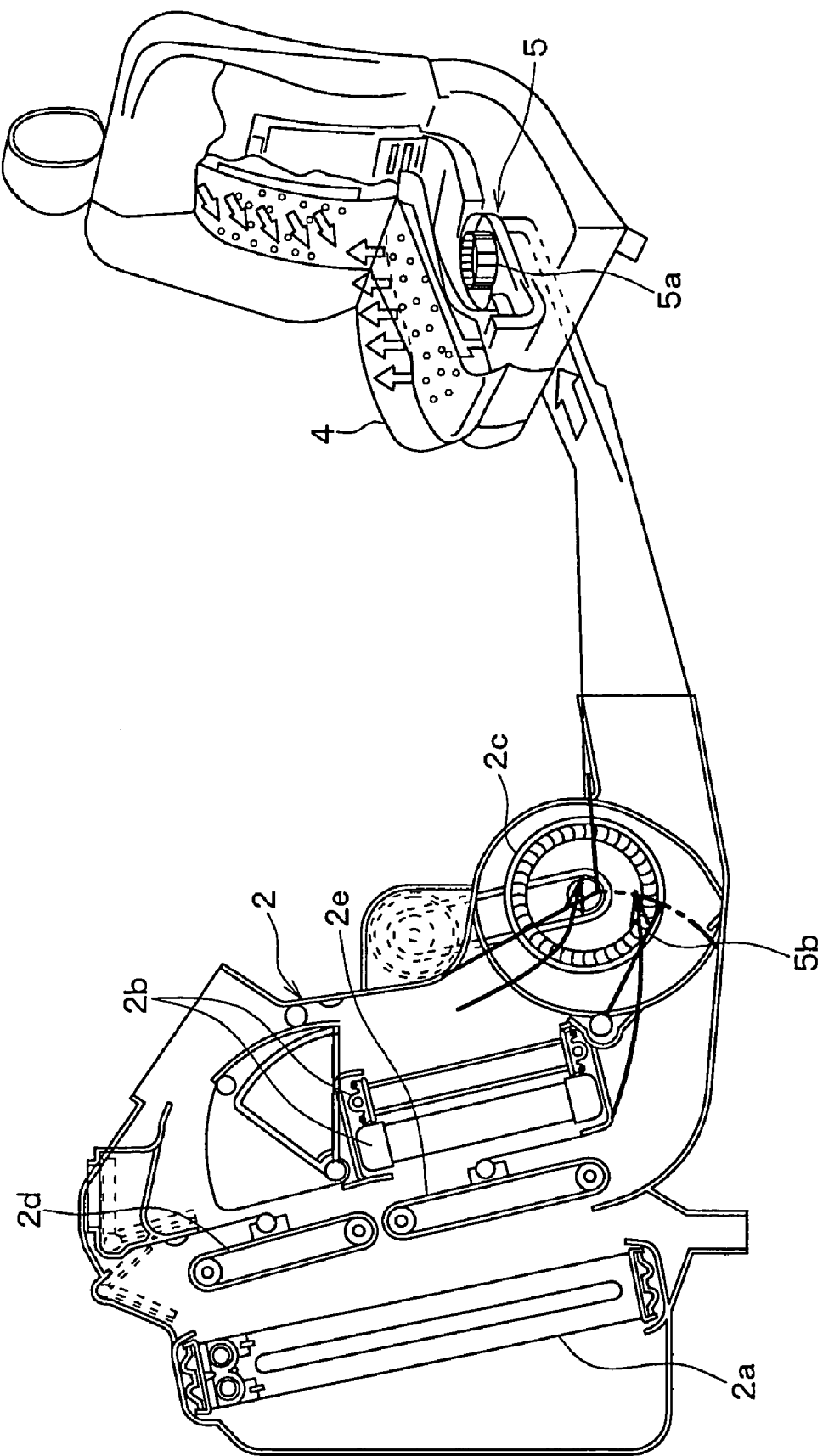
FIG. 2 is a cross sectional view for an air conditioning unit and a perspective view of a seat in the vehicle of a first embodiment of the present invention.

As shown in FIG. 2, doors 2d and 2e have a film-like configuration serving as means for controlling the air-flow passage. The door 2d controls the communicating condition of a passage for the cooled air bypassing the heater 2b, while the door 2e controls the communicating condition of a passage for the air passing through the heater 2b after having passed the low pressure heat exchanger 2a.

Figure 3:
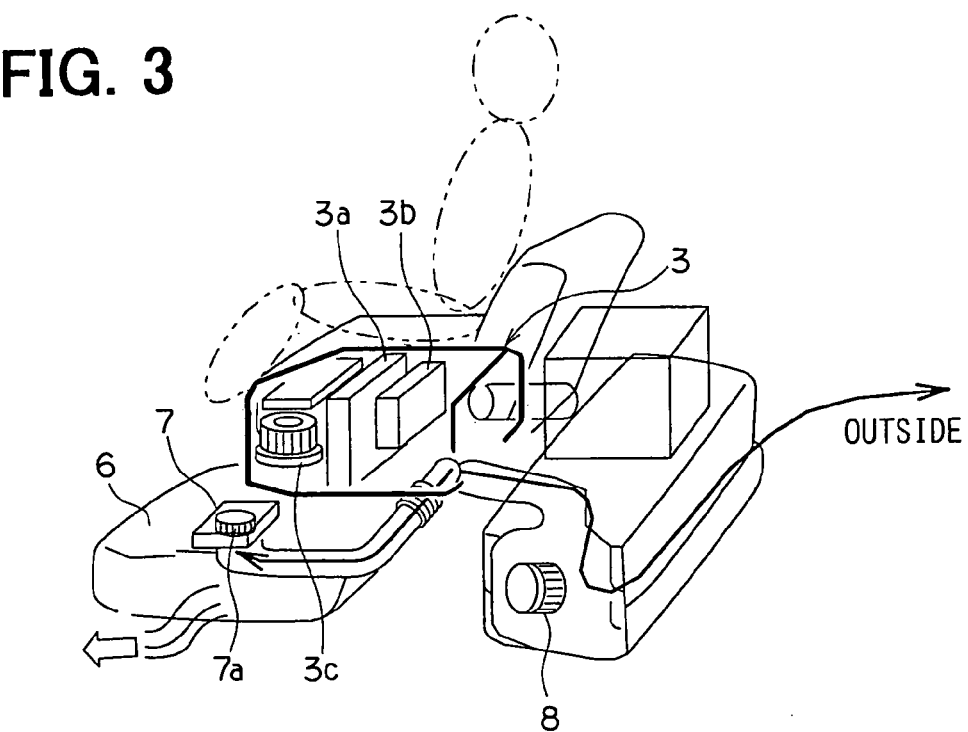
FIG. 3 is a perspective view showing an air conditioning apparatus for a rear side of the vehicle in the first embodiment of the present invention.

Doors corresponding to means for controlling air-flow passage such as doors 2d and 2e are omitted in FIG. 3.

As shown in FIG. 2, the front-seat air conditioning unit blows out air, which is conditioned in temperature and sent from the front-side air conditioning unit 2, through the surface of the seat 4 by a blower 5a arranged under the seat 4. Similar to the front-seat air conditioning unit 5, as shown in FIG. 3, the rear-seat air conditioning unit 7 blows out air, which is conditioned in temperature and sent from the rear-side air conditioning unit 3, through the surface of the seat 6 by a blower 7a arranged under the seat 6.

As shown in FIG. 2, in the front-seat air conditioning unit 5, the temperature of the air blown through the surface of the seat 4 is controlled by adjusting the mixing rate between the cooled air and the heated air by using an air mix door 5b provided at the front-side air conditioning unit 2. In the rear-side air conditioning unit 3 shown in FIG. 3, temperature adjusting means such as the air mix door 5b is omitted from showing. As shown in FIG. 3, an exhausting blower 8 is provided in a trunk room to forcibly exhaust the air in the passenger compartment in this embodiment.

As shown in FIG. 1, an instrumental panel 10 is provided at the front side of the vehicle so as to be elongated in a width direction of the vehicle. The instrumental panel 10 has an indicator section for displaying a vehicle speed, an engine revolution and the like, and a control device 500 for the air conditioning apparatus including a control flow shown in FIG. 6. Further, the instrumental panel 10 has a steering blow-out port 11a located near the indicator section 11 for blowing the conditioned air toward a steering wheel 12 as controlling means operated by a driver.

In a center portion of the instrumental panel 10 in the width direction of the vehicle, and right and left sides of the instrumental panel 10 in the width direction of the vehicle, a center face blow-out port 13, and side face blow-out ports 14 are provided, respectively. A louvered window 15 is provided in at least one of the center face blow-out port 13 and the side face blow-out ports 14 located at a driver side in order to control a blowing direction of the conditioned air. The louvered window 15 is controlled by an actuator such as an electric motor so as to be swung automatically.

Figure 4:
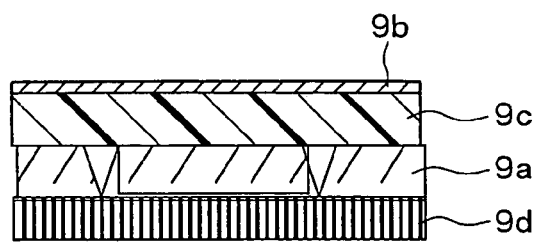
FIG. 4 is a cross sectional view showing an inner package of the vehicle of the first embodiment of the present invention.

In this embodiment, as shown in FIG. 4, a multi-layered structure including a 3D net 9a having plural 3-dimentional vents is employed as a wall material for an interior, so that the air sent from the front-side air conditioning unit 2 and the rear-side air conditioning unit 3 can be blown out through doors, a ceiling, and the instrumental panel (see elliptical hatched portions shown in FIG. 1).

In this embodiment, the wall material is composed of a metal body 9b, a heat-insulation layer 9c made of resin material such as polyurethane and polyester, 3D net 9a and a design epidermal surface 9d having breathability arranged in this order from the outside of the vehicle. Further, electrification fabric lining foundation cloth material is employed as the design epidermal surface 9d so that an outside thereof serves as a filter for filtering dust.

To form an air passage inside the wall material, a wall is formed so that the 3D net is welded to the wall, and then, a predetermined portion of the 3D net is melted.

Figure 6:
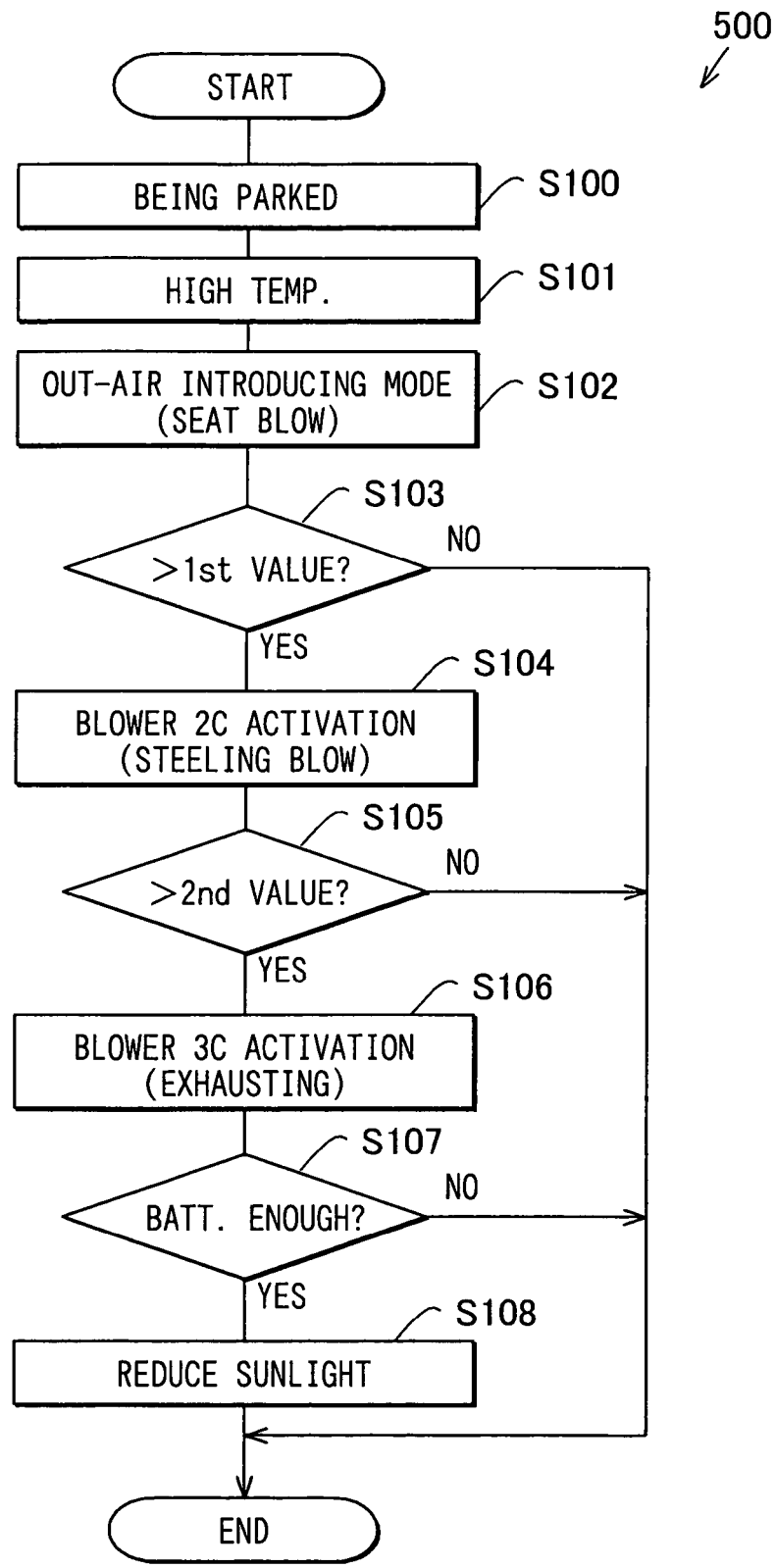
FIG. 6 is a flow chart showing control of air conditioning while the vehicle is parked.

Next, an operation of the air conditioning in this embodiment will be described with reference to a flow-chart shown in FIG. 6.

When the control device 500 in the air conditioning apparatus, while the vehicle is parked (step S100), detects at least one of the conditions (step S101) where the outside temperature is equal to or higher than 20 degrees centigrade, where the inside temperature of the vehicle is equal to or higher than 40 degrees centigrade, and where the amount of sunlight incident into the passenger compartment is equal to or higher than 150 W/m$^2$, an outside-air introducing mode is set to introduce the air from the outside of the vehicle, and at least the blower 5a of the front-seat air conditioning unit 5 is activated to ventilate the air in the passenger compartment by blowing the air at a predetermined amount (for example, 40 m$^3$/h) from the surface of the seat 4 (step S102).

When the remaining amount of the power in a battery is equal to or higher than a first predetermined value (step S103), the air is blown, by activating the blower 2c in the front-side air conditioning unit 2, toward the steering wheel 12 at a predetermined amount (for example, 160 m$^3$/h) from at least one of the steering wheel blow-out port 11a, the center face blow-out port 13 and the side face blow-out port 14 at the driver's side to ventilate the air inside the passenger compartment (step S104).

In a case where the air is blown toward the steering wheel 12 from the center face blow-out port 13 or the side face blow-out port 14 at the driver's side, the blowing direction of the air is adjusted by activating the louver 15 so as to be oriented to the steering wheel 12.

When the remaining amount of the power in the battery is equal to or higher than a second predetermined value which is greater than the first predetermined value (step S105), in addition to the air blowing to the steering wheel 12, the inside air is exhausted from the passenger compartment to the outside of the vehicle at around 80 m$^3$/h of the exhausting air flow amount by activating the blower 3c in the rear-side air conditioning unit 3 (step S106).

At a situation described just above, when the remaining amount of the battery power is enough (step S107), the sunlight incident reducing means 1 may be operated to block the sunlight coming into the passenger compartment so as to reduce the incident amount of the sunlight (step S108).

In this embodiment, the rear-seat air conditioning unit 7 only has an inside-air circulation mode. However, the rear-seat air conditioning unit 7 can have an outside-air introducing mode. In this case, the blower 7a is activated when the outside-air introducing mode is selected.

In this embodiment, it is determined that the vehicle is parked when a starter switch such as an ignition switch is turned off, while it is determined that the vehicle is in a condition other than being parked when the starter switch is turned on.

It can be also determined that the vehicle is parked when the vehicle is not traveling, just stopping somewhere with the engine being activated with the ignition switch being turned on.

The amount of sunlight incident into the passenger compartment is determined in accordance with a detected signal of a sunlight amount sensor of the air conditioning apparatus mounted in the passenger compartment. The outside-air temperature is determined in accordance with a detected signal of an outside-air temperature.

In this embodiment, the air within the space close to a seat and/or a steering wheel to which a passenger makes a direct contact is preferentially ventilated as compared to the other space for ventilation in a passenger compartment while the vehicle is parked. Therefore, the uncomfortable feeling of the passenger that might occur when she/he is getting into the vehicle can be efficiently reduced with less power as compared to the invention described in the above-mentioned Japanese patent application disclosure which tries to ventilate the whole space in a passenger compartment. Therefore, the air in the passenger compartment is effectively ventilated while the power consumption is prevented from increasing.

Further, the sunlight incident reducing means 1 may reduce the amount of sunlight incident into the passenger compartment, and therefore, the temperature of material having relatively large thermal capacity such as the seat, instrumental panel, and inner wall (interior surface of the passenger compartment) is prevented from increasing.

Therefore, the air in the passenger compartment is prevented from being heated by the radiant heat from the seat and instrumental panel and the like, so that the temperature in the passenger compartment is prevented from drastically being increased.

Figure 5:
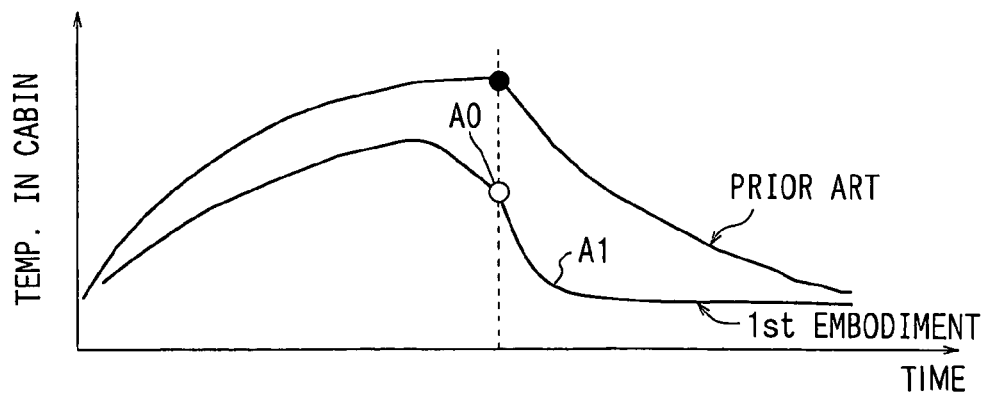
FIG. 5 is a graph showing a relationship between a room temperature and time under control of ventilation while the vehicle is parked.

As a result, a passenger would not feel so hot in the vehicle by the radiant heat and/or heat at the temperature when he/she is getting into the vehicle at a time A0 as shown in FIG. 5. Then, the passenger would feel comfort within, for example, 30 seconds after getting in the vehicle (after he/she activates the air conditioning apparatus) at a time A1 as shown in FIG. 5. Accordingly, the temperature in the passenger compartment can be lowered to a point where the passenger can feel comfortable soon. Namely, the air conditioning apparatus in this embodiment can provide the passenger with the comfortable space soon while the power consumption is restrained.

Since the wall material is multi-layered including the 3D net 9a having 3-dimentional vents, the heat insulation efficiency can be raised while the heat capacity in the wall material can be reduced. Therefore, the temperature in the cabin can be immediately lowered when the passenger gets in the vehicle.

As a result, the downsizing of the air conditioning apparatus can be possible.

In the above-mentioned embodiment, the sunlight incident into the cabin is blocked or reduced by the sunlight incident reducing means 1 such as the light-transmissivity control glass while the ventilation of the air in the cabin is performed. However, the invention is not limited to this embodiment. Various conditions can be applied to activate the above-mentioned air conditioning unit(s).

As to the amount of sunlight incident into the cabin for activating at least one of the air conditioning units described above, it might be desired to apply the accumulated amount of the sunlight since the vehicle is parked.

Although the sunlight is blocked or reduced when the amount of the sunlight incident into the cabin reaches 150 $W/m^2$ in the above-described embodiment, it is also applicable to block or reduce the sunlight when a position of the sun is within a predetermined range by detecting the current position of the sun using, for example, the GPS (Global Positioning System) and/or a pre-installed calendar or the like.

Although the ventilation of the air is conducted by using the blowers 2c and 3c in the air conditioning units 2 and 3 in addition to the blowers 5a and 7a in both seat air conditioning units 5 and 7 in the above-described embodiment, the present invention is not limited to this. For example, there is a situation where only some or one of the blowers 2c, 3c, 5a and 7a may be activated.

In this case, it might be better that the blowers 5a and 7a of the seat air conditioning units 5 and 7 are activated, since the feeling of comfort for the passenger is relatively easily obtained with a small capacity in the air conditioning when activating the seat air conditioning unit.

When the passenger returned to the parking vehicle operates a switch (for example, a switch for opening a window, door knob or an accessory switch) while the sunlight is blocked or reduced while the vehicle is parked, it is possible to start operating an engine of the vehicle to activate the refrigerant cycle in the air conditioning apparatus to thereby immediately lowering the temperature in the cabin.

It is also possible to ventilate the cabin by introducing the air from the outside of the vehicle while the instrumental panel 10 is cooled by blowing the air to the instrumental panel 10 which is introduced from the outside of the vehicle while the vehicle is parked.

A diffusion blow-out port may be formed on the instrumental panel 10 to disperse the air from an entire upper part of the instrumental panel 10 to the passenger compartment.

An electrically-operable sunshade can be employed as the sunlight incident reducing means 1 instead of using light-transmissivity control glass. The electrically-operable sunshade is the one such as a curtain (cloth) which blocks the sunlight incident through the glass and which is opened/closed so as to be rolled-up/unrolled by an electric motor controlled by an electrical control device.

While the present invention has been shown and described with reference to the foregoing preferred embodiment, it will be apparent to those skilled in the art that changes in form and detail may be therein without departing from the scope of the invention as defined in the appended claims.

What is claimed is:

1. An air conditioning apparatus comprising:
   a control device mounted on a vehicle capable of determining whether the vehicle is parked; and
   an air blowing portion provided for a seat in a passenger compartment of the vehicle, said air blowing portion capable of blowing air through a surface of the seat to ventilate the passenger compartment when said control device determines that the vehicle is parked and determines that no passenger is in the passenger compartment, wherein:
   the air blowing portion is activated to blow air at least through the surface of the seat and to ventilate the passenger compartment immediately when a condition where a temperature therein is equal to or higher than a predetermined temperature.

2. An air conditioning apparatus according to claim 1, wherein:
   the air blowing portion is activated to ventilate the passenger compartment in a condition where temperature at an outside of the vehicle is equal to or higher than a predetermined temperature.

3. An air conditioning apparatus according to claim 1, wherein a refrigerant device for the air conditioning apparatus is activated in a situation where a control switch provided in the passenger compartment is operated by a passenger.

4. An air conditioning apparatus comprising:
   a control device mounted on a vehicle capable of determining whether the vehicle is parked; and
   an air blowing portion provided for a seat in a passenger compartment of the vehicle, said air blowing portion capable of blowing air through a surface of the seat to ventilate the passenger compartment when said control device determines that the vehicle is parked, wherein:
   the air blowing portion is activated to ventilate the passenger compartment in a condition where an amount of sunlight incident therein is equal to or higher than a predetermined value.

5. An air conditioning apparatus comprising:
   a control device mounted on a vehicle capable of determining whether the vehicle is parked;
   an air blowing portion provided for a seat in a passenger compartment of the vehicle, said air blowing portion capable of blowing air through a surface of the seat to ventilate the passenger compartment when said control device determines that the vehicle is parked; and
   a wall for an interior of the passenger compartment composed of a net structural body having a plurality of three dimensional vents at a back side thereof and having a breathable surface at a front side thereof, wherein the air is blown through said net structural body to the passenger compartment.

6. An air conditioning apparatus for lowering temperature in a passenger compartment of a vehicle by ventilation, comprising:
   an air conditioning unit for conditioning an inside of the passenger compartment;
   a seat air conditioning unit for blowing air through a surface of a seat provided in the passenger compartment; and
   a control device for controlling said air conditioning unit and said seat air conditioning unit, wherein said control device has:
   means for setting an outside-air introducing mode in which air is introduced into the passenger compartment from an outside of the vehicle by controlling said air conditioning unit in a case where the control device detects a condition in which temperature in the compartment is equal to or higher than a predetermined level when the vehicle is parked, and for blowing the air through the surface of the seat by activating a blower provided in the seat air conditioning unit to immediately ventilate the passenger compartment when the control device determines that no passenger is in the passenger compartment and a temperature therein is equal to or higher than a predetermined temperature.

7. An air conditioning apparatus according to claim 6, wherein:
   said condition in which the temperature in the compartment is equal to or higher than the predetermined level is determined when at least one of specific conditions is detected, wherein said specific conditions are a condition where an outside temperature is equal to or higher than a predetermined outside temperature, a condition where an inside temperature is equal to or higher than a predetermined inside temperature, and a condition where an amount of sunlight incident into the passenger compartment is equal to or higher than a predetermined amount.

8. An air conditioning apparatus for lowering temperature in a passenger compartment of a vehicle by ventilation, comprising:
   an air conditioning unit for conditioning an inside of the passenger compartment;
   a seat air conditioning unit for blowing air through a surface of a seat provided in the passenger compartment; and
   a control device for controlling said air conditioning unit and said seat air conditioning unit, wherein said control device has:
   means for setting an outside-air introducing mode in which air is introduced into the passenger compartment from an outside of the vehicle by controlling said air conditioning unit in a case where the control device detects a condition in which temperature in the compartment is equal to or higher than a predetermined level when the vehicle is parked, and for blowing the air through the surface of the seat by activating a blower provided in the seat air conditioning unit to ventilate the passenger compartment; and
   means for determining whether the vehicle is parked in accordance with a condition of a starter switch for the vehicle, wherein said means for setting the outside-air introducing mode and for blowing the air is activated when it is determined that the vehicle is parked.

9. An air conditioning apparatus according to claim 8, wherein:
   said air conditioning unit has at least one of a steering blow-out port for blowing the air toward a steering for a passenger which is provided close to an indicator section of an instrumental panel, a center face blow-out port and a side face blow-out port, wherein:
   said control device further includes:
   means for blowing the air toward the steering through the one of the steering blow-out port, the center face blow-out port and the side face blow-out port when it is determined that the vehicle is parked and when a remaining power level of a battery mounted on the vehicle is equal to or higher than a first predetermined level.

10. An air conditioning apparatus according to claim 9, further comprising:
    a rear-side air conditioning unit, wherein:
    said control device further includes means for exhausting the air inside the passenger compartment to the outside of the vehicle by activating a blower provided in said rear-side air conditioning unit when the remaining power level of the battery is equal to or higher than a second predetermined level greater than said first predetermined level.

11. An air conditioning apparatus according to claim 10, further comprising:
    a sunlight incident reducing device, wherein:
    said means for exhausting the air operates said sunlight incident reducing device to reduce the amount of sunlight incident into the passenger compartment when the remaining power level of the battery is equal to or higher than a second predetermined level greater than said first predetermined level.

12. An air conditioning apparatus comprising:
    a control device mounted on a vehicle capable of determining whether the vehicle is parked;

an air blowing portion provided for a seat in a passenger compartment of the vehicle, said air blowing portion capable of blowing air through a surface of the seat to ventilate the passenger compartment when said control device determines that the vehicle is parked; and means for setting an outside-air introducing mode, the setting means and the air blowing portion being activated when it is determined that the vehicle is parked, wherein:

the control device determines whether the vehicle is parked in accordance with a condition of a starter switch for the vehicle.

* * * * *